(12) United States Patent
Gruen et al.

(10) Patent No.: US 8,138,871 B2
(45) Date of Patent: Mar. 20, 2012

(54) POLE TUBE

(75) Inventors: Juergen Gruen, Lohr (DE); Christoph Giegerich, Moemlingen (DE); Roland Schempp, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 677 days.

(21) Appl. No.: 12/161,208

(22) PCT Filed: Jan. 9, 2007

(86) PCT No.: PCT/EP2007/000100
§ 371 (c)(1),
(2), (4) Date: Jul. 17, 2008

(87) PCT Pub. No.: WO2007/082651
PCT Pub. Date: Jul. 26, 2007

(65) Prior Publication Data
US 2010/0301244 A1    Dec. 2, 2010

(30) Foreign Application Priority Data

Jan. 17, 2006 (DE) .......................... 10 2006 002 362
Mar. 27, 2006 (DE) .......................... 10 2006 014 020

(51) Int. Cl.
*H01F 3/00* (2006.01)
*H01F 7/08* (2006.01)
*F16K 31/02* (2006.01)

(52) U.S. Cl. ........ 335/281; 335/219; 335/220; 335/255; 335/296; 335/297; 251/129.15; 29/607

(58) Field of Classification Search .................. 335/219, 335/296, 297, 220–282; 251/129.15; 29/607
See application file for complete search history.

(56) References Cited

U.S. PATENT DOCUMENTS
2,863,473 A * 12/1958 Gantz ...................... 137/599.18
(Continued)

FOREIGN PATENT DOCUMENTS
DE         19707587         8/1998
(Continued)

OTHER PUBLICATIONS

Database WPI Week 198806, Derwent Publications Ltd., London, GB, AN 1988-041362, XP002432217 & SU 1 320 032 A (Bibylev V B), Jun. 30, 1987.

*Primary Examiner* — Mohamad Musleh
(74) *Attorney, Agent, or Firm* — Leydig, Voit & Mayer, Ltd.

(57) ABSTRACT

A pole tube of a solenoid actuator including a non-magnetic intermediate piece having a first intermediate end face and a second intermediate end face, a pole piece having a pole end face configured to join the first intermediate end face at a first joining region, and a tube piece having a tube end face configured to join the second intermediate end face at a second joining region. At least two of the intermediate piece, the pole piece and the tube piece are configured to be connectable to each other using electric fusion. At least two of the intermediate piece, the pole piece and the tube piece have a different conductivity. A respective part of the pole and tube pieces disposed in corresponding first and second joining regions are configured to each have an electrical resistance substantially equal to an electrical resistance of a part of the intermediate piece.

8 Claims, 4 Drawing Sheets

U.S. PATENT DOCUMENTS

| | | | | |
|---|---|---|---|---|
| 3,235,777 | A * | 2/1966 | Hatashita | 335/254 |
| 4,004,343 | A * | 1/1977 | Marsden | 29/596 |
| 4,468,647 | A * | 8/1984 | Gibas | 335/262 |
| 4,553,735 | A * | 11/1985 | Brundage | 251/129.16 |
| 4,694,270 | A * | 9/1987 | Ichihashi | 335/260 |
| 5,050,840 | A * | 9/1991 | Kondo et al. | 251/129.15 |
| 7,150,196 | B2 * | 12/2006 | Segawa et al. | 73/722 |
| 2005/0068136 | A1* | 3/2005 | Schempp et al. | 335/220 |
| 2006/0114089 | A1* | 6/2006 | Schempp et al. | 335/220 |
| 2006/0180783 | A1* | 8/2006 | Tackes et al. | 251/129.15 |
| 2009/0134348 | A1* | 5/2009 | Reiter | 251/129.15 |
| 2010/0156580 | A1* | 6/2010 | Bill et al. | 335/219 |

FOREIGN PATENT DOCUMENTS

| | | |
|---|---|---|
| DE | 10243165 | 9/2003 |
| EP | 278227 A2 * | 8/1988 |
| EP | 464370 A1 * | 1/1992 |
| EP | 569669 A1 * | 11/1993 |
| JP | 07164158 | 6/1995 |
| JP | 09066368 | 3/1997 |
| JP | 10128550 | 5/1998 |
| SU | 1320032 | 6/1987 |

* cited by examiner

POLE TUBE

CROSS REFERENCE TO PRIOR APPLICATIONS

This application is a U.S. National Phase application under 35 U.S.C. §371 of International Application No. PCT/EP2007/000100, filed on Jan. 9, 2007 and claims benefit to German Patent Application Nos. DE 10 2006 002 362.5, filed on Jan. 17, 2006 and DE 10 2006 014 020.6 filed on Mar. 27, 2006. The International Application was published in German on Jul. 26, 2007 as WO 2007/082651 under PCT Article 21 (2).

BACKGROUND

The present invention relates to a pole tube of a solenoid actuator, for a hydraulic valve in particular and to a solenoid actuator provided with a pole tube of this type.

A pole tube of this type is described in DE 102 43 165 A1 and is a component of a pressure-tight solenoid actuator which comprises, in addition to the pole tube, a coil for actuating an armature which is guided so as to be able to move axially in an armature chamber of the pole tube, the coil surrounding the pole tube. Said pole tube substantially comprises a pole piece which can be screwed into a valve housing via a central thread, a non-magnetic intermediate piece and a tube piece which is attached thereto and is sealed at its face remote from the pole piece by means of a component which acts as a stroke limiter. The stroke limiter may also be integrated into the tube piece. The pole piece, the intermediate piece, the tube piece and the stroke limiter delimit the armature chamber for the armature which cooperates with the coil. The armature is connected to a ram or is formed as a separate part which penetrates the pole piece in the axial direction and serves to actuate a valve slide of the hydraulic valve. The non-magnetic intermediate piece acts to divert the magnetic flux into the armature.

This non-magnetic intermediate piece can be fitted in the pole tube as described in DE 197 07 587 A1 by using a bronze build-up welding process or by soldering austenitic steel, for example. When employing methods of this type, it is necessary to finish the pole tube on the inner circumferential wall delimiting the armature chamber in order to produce a smooth running surface for the armature. In order to eliminate this drawback, it is described in the aforementioned patent DE 102 43 165 A1 to thermally join the pole piece, the intermediate piece and the tube piece in such a way that a smooth running surface is produced without finishing being required. The capacitor discharge welding process (CDW) was found to be particularly advantageous as a thermal joining method, as due to the partial fusing effect, this method makes it possible to connect the components to one another without annealing and distortion.

It has been found, however, that this process may result in slight distortion of the components or an excessive thermal load on the components in pole tubes which are constructed in a complex manner or have thin walls, due to the energy introduced into the pole piece, the intermediate piece and the tube piece for the fusing process, so further finishing is required before the armature is inserted into the armature chamber. However, a finishing process of this type requires a pole tube which is open at one end, so the stroke limiter, for example, which delimits the stroke of the armature, cannot be formed in one piece with the tube piece but must be fitted subsequently.

In contrast, the object of the invention is to provide a pole tube and a solenoid actuator which can be produced simply without requiring finishing.

SUMMARY OF THE INVENTION

An aspect of the present invention provides a device wherein the end face geometry of the joining partners, i.e. the pole piece, the non-magnetic intermediate piece and the tube piece, is selected in such a way that the resulting electrical resistance of the joining partners in the joining region, i.e. in the region to be fused, is substantially the same. This measure provides that the heat input to the joining partners during welding is approximately the same so the components can be connected to one another with a high degree of precision and without requiring finishing; the manufacturing costs for a pole tube of this type may be substantially reduced in comparison with conventional solutions. Furthermore, this procedure may prevent overheating and thus prevents structural transformation of one of the joining partners so the manufacturing quality is further improved.

According to one aspect of the present invention, shaping is carried out while taking into consideration the melting points of the materials and the fact that, when the end faces are shaped, a joining partner made of a material with a comparatively low melting point should not be heated to its melting temperature prematurely, that is to say before the other joining partner is fused.

It is preferred, according to the present invention, for the end face of the joining partner made of a material with lower resistivity to be formed with a smaller cross-sectional area than the other joining partner with greater resistivity.

In this case, the other component is provided with a correspondingly larger end face; according to the invention, this component is preferably formed with a planar end face.

The joining partner with lower resistivity may be provided in the joining region with at least one roof-shaped projecting annular projection, the apex of which then forms the resulting cross-sectional area.

The joining partners formed according to the invention may be connected in a particularly simple manner by capacitor discharge welding (CDW). Other resistance welding methods or the like may of course also be used.

Further advantageous configurations of the invention are the subject-matter of other sub-claims.

BRIEF DESCRIPTION OF THE DRAWINGS

Preferred embodiments of the invention will be described in greater detail in the following with reference to the schematic drawings, in which.

DETAILED DESCRIPTION

Figure 1:
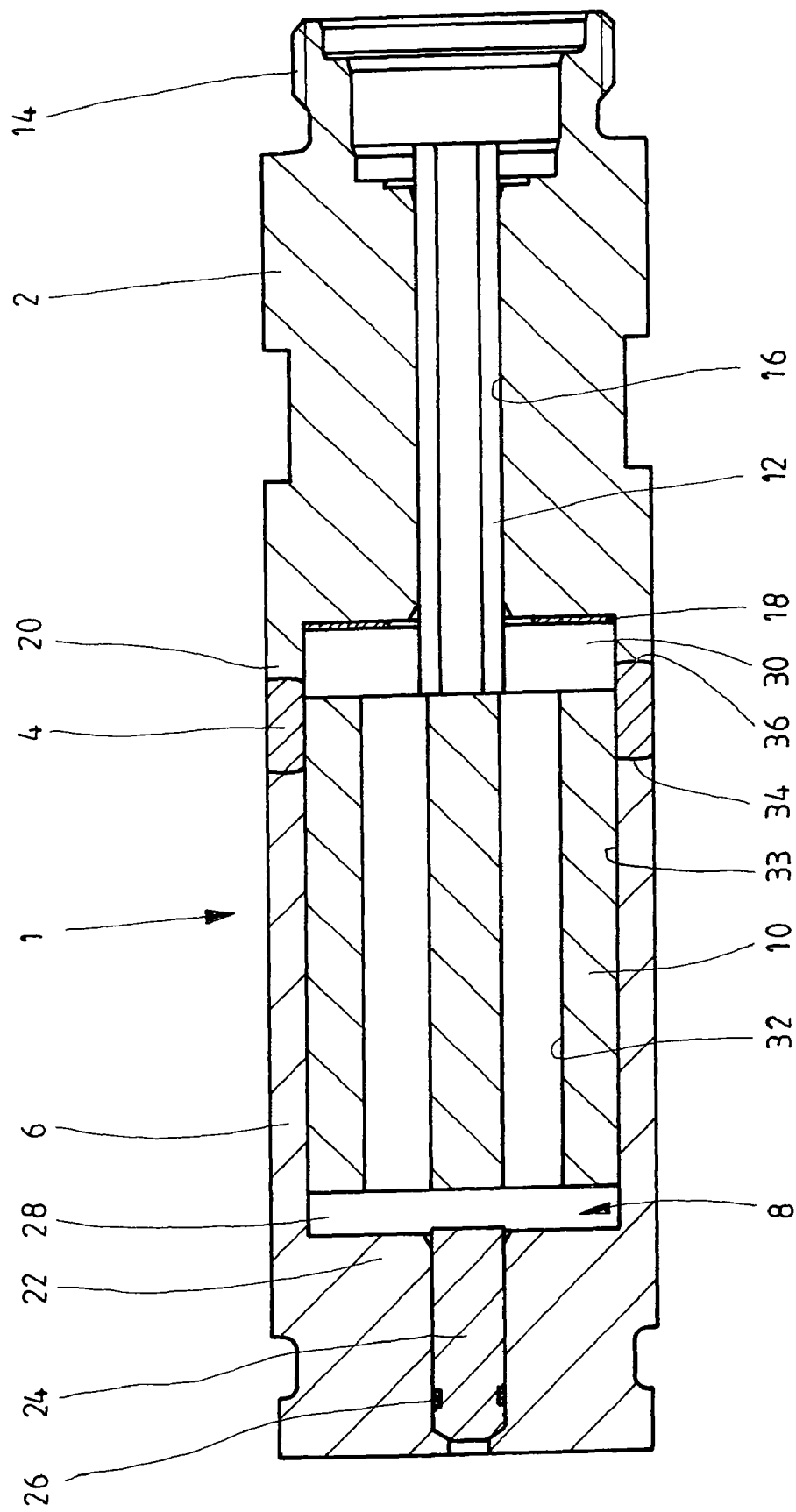
FIG. 1 is a longitudinal section through a pole tube of a solenoid actuator of a hydraulic valve.

FIG. 1 is a longitudinal section through a pole tube 1 of a single-acting solenoid actuator constructed in a pressure-tight manner. The pole tube 1 substantially comprises a pole piece 2, an intermediate piece 4 and a tube piece 6 which are connected to one another by a thermal joining process, capacitor discharge welding (CDW) in the embodiment shown. These three components together form an armature chamber 8 in which an armature 10 of the solenoid actuator is guided so as to be able to move axially. Fastened or releasably mounted on the armature 10 is a ram 12 which penetrates the pole piece 2 in the axial direction and which serves to actuate a valve spool of a valve which is to be actuated by the solenoid actuator.

In its end portion shown on the right in the figure, the pole piece 2 has a central thread 14, with which it may be screwed into a valve hole of a valve housing in such a way that the ram 12 attains a functional connection with the valve spool of the valve. The ram 12, provided with a hexagonal cross-section in the embodiment shown, penetrates a through-hole 16 of the pole piece 2, which hole extends in a step-like manner in the region of the central thread 14 at one end and opens out into the armature chamber 8 at the other. A thin anti-adhesive plate 18, which prevents the armature 10 from adhering magnetically in its end position to the right, is attached to the end face, through which the ram 12 penetrates, of the armature 10.

The end portion shown on the left in FIG. 1 of the pole piece 2 forms an annular wall 20, to the end face of which the annular intermediate piece 4 is attached. This annular intermediate piece 4 is composed of a non-magnetisable material, for example austenitic steel or bronze. In contrast, the pole piece 2 and the tube piece 6 are composed of a magnetisable material, for example free-cutting steel.

The tube piece 6 is connected to the end face of the intermediate piece 4 remote from the pole piece 2 and has a roughly cupular construction, the bottom of which forms a stroke limiter 22 for the armature 10. In the embodiment shown, this stroke limiter 22 is constructed in one piece with the tube piece 6. However, this stroke limiter may, in principle, also be inserted into a tubular tube piece and be connected thereto by flanging, welding or the like. For emergency actuation, for example during a power failure, a hand-held emergency pin 24 is guided so as to be axially displaceable in the stroke limiter 22, the armature chamber 8 being sealed in relation to the surroundings by an O-ring 26 inserted into an annular groove of the hand-held emergency pin 24. The armature 10 divides the armature chamber 8 into a pin-side chamber portion 28 and a ram-side chamber portion 30 which are connected to one another by longitudinal holes 32 in the armature 10. The inner circumferential walls of the tube piece 6, the intermediate piece 4 and the pole piece 2, or more specifically the annular wall 20, form a running surface 33 for the armature 10.

In the embodiment shown, the pole piece 2, the intermediate piece 4 and the tube piece 6 are connected to one another by welding, preferably capacitor discharge welding (CDW), the joining or fusion regions 34, 36 being merely indicated between said components in FIG. 1. The specific configuration can be achieved in different ways in accordance with the embodiments described below.

Figure 2:
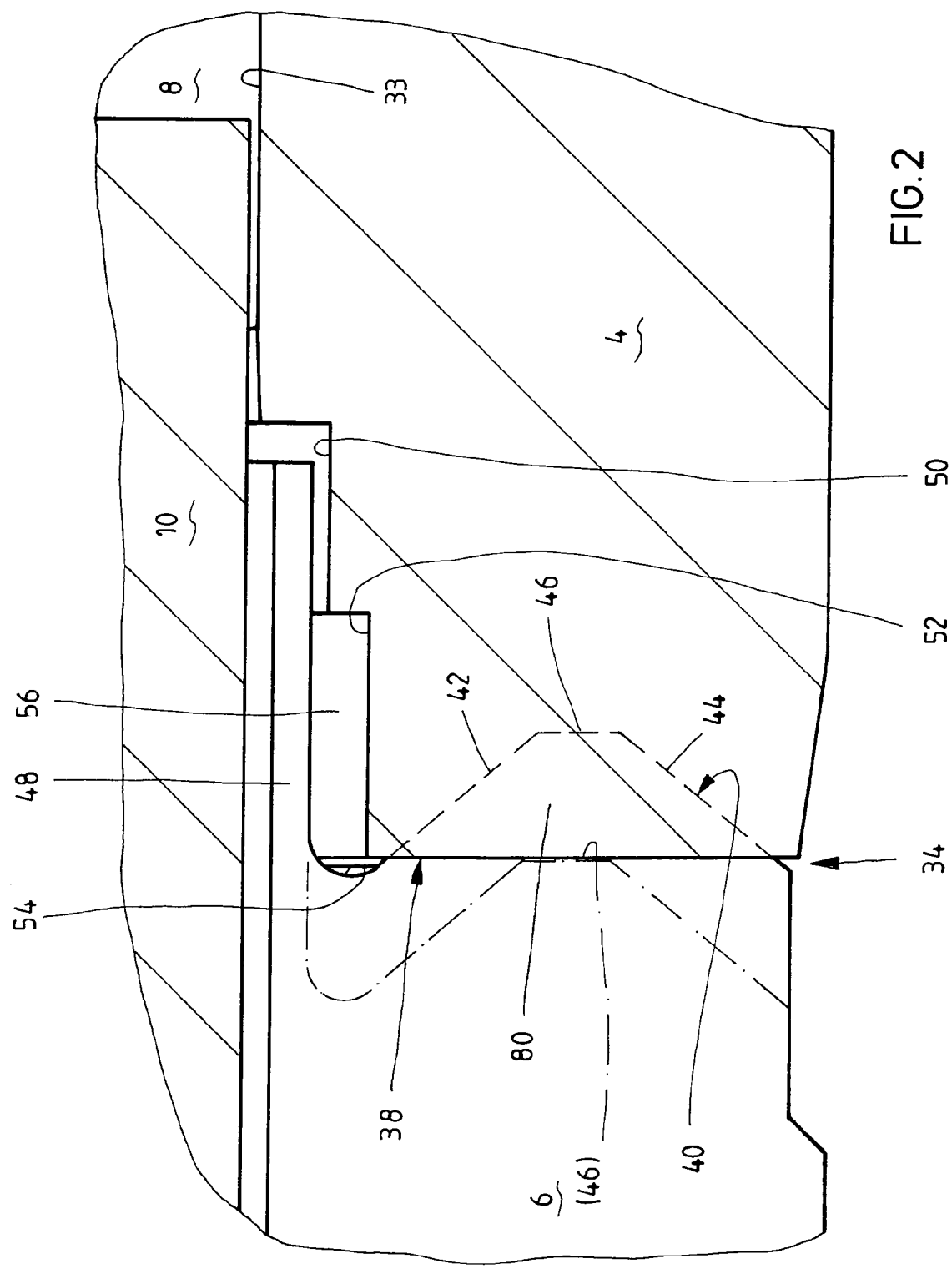
FIG. 2 is a detail view of a joining region between a tube piece and a non-magnetisable intermediate piece.

FIG. 2 is an enlarged view of the joining region 34, along which the intermediate piece 4 and the tube piece 6 are connected to one another. The two annular end faces 38 facing the tube piece 6 and the pole piece 2 are provided as smooth faces extending in the radial direction. The adjacent annular end face 40 of the tube piece 6 is provided with a circumferential trapezium-shaped projection 80 which is delimited by two circumferential obliquely arranged side faces 42, 44 and an annular flattened portion 46. Formed on the pole piece 2 is a corresponding trapezium-shaped projection which cooperates with the radially extending annular end face of the intermediate piece 4.

A somewhat unusual display format is selected for the illustration in FIG. 2, the original profiles (prior to welding) of the annular end faces of the intermediate piece 4 and the tube piece 6 (pole piece 2) being shown in the welded relative position of said components. In the embodiment shown, the actual joining region 34 (after welding) extends approximately along the radial annular end face 38. As shown in broken lines in FIG. 2, the flattened portion 46 rests in a planar manner against the annular end face 38 prior to the fusing process. The two joining partners 4, 6 are connected to one another by capacitor discharge welding, the annular end face 38 of the intermediate piece 4 substantially retaining its position, however, whereas the trapezium-shaped projection fuses on and the tube piece 6 is correspondingly moved towards the right in the axial direction until it reaches its join position shown in a solid line in FIG. 2. The heat input to both joining partners is substantially the same during this fusing process so said joining partners fuse simultaneously and uniformly at approximately the same melting point in such a way that no distortion of the pole tube 1 occurs. The equal heat input to both components is achieved in this process according to the invention due to the fact that the cross-sectional area of the joining partner with lower resistivity is constructed so as to be smaller than the cross-sectional area of the joining partner with greater resistivity. If, for example, an austenitic steel is used for the intermediate piece 4 and a conventional free-cutting steel is used for the tube piece 6, the resistivity of the austenitic steel is greater than that of the free-cutting steel and the cross-sectional area of the tube piece 6 made of the free-cutting steel must accordingly be reduced until the resulting resistance of both joining partners is substantially the same so when current is applied during the capacitor discharge process substantially equal currents flow and a correspondingly equal heat input is achieved to fuse the joining region. In the embodiment shown, the annular end face 38 and the flattened portion 46 are configured as planar surfaces, but these may, in principle, also be configured as angled or curved surfaces, merely a defined bearing surface being required in each case in order to observe the geometry described above.

A further characteristic of the embodiment shown in FIG. 2 lies in the fact that a cover which covers the joining region 34 is provided in the form of a hub-shaped axial projection 48 radially inside the trapezium-shaped projection of the tube piece end face 40. The axial projection extends away from the tube piece 6 and projects into a recess in the intermediate piece 4, the recess being formed by two annular recesses which are offset in a stepped manner, i.e. an annular recess 50 and a lower inner annular recess 52. A depression 54 is formed in the transition region between the axial projection 48 and the trapezium-shaped projection. Said depression 54, the axial projection 48 and the circumferential wall of the inner annular recess 52 delimit an accommodating area 56 which opens out towards the armature chamber 8 via a gap between the end portion of the axial projection 48 and the circumferential wall of the annular recess 50. An axial projection and an accommodating area are correspondingly formed in the joining region between the pole piece 2 and the intermediate piece 4. The hub-shaped axial projections 56 cover the joining regions 34 in relation to the armature chamber 8 so no molten material can enter the armature chamber. Molten material which may escape from the joining region can be accommodated in the accommodating area 56 and in this way the running surface 33 is prevented from clogging so the armature 10 cannot become jammed.

In the embodiment shown, the hub-shaped axial projections 48 are formed on the tube piece 6 and the pole piece 2. In a kinematic reversal, however, the axial projections may of course be formed on the intermediate piece 4 and project in the direction towards the pole piece 2 or the tube piece 6, which then form, together with the recesses on the pole piece and the tube piece, accommodating areas which correspond to the axial projection. For further details, reference is made to a corresponding patent application filed on the same day by the Applicant which forms part of the disclosure of the present patent application.

Figure 3:
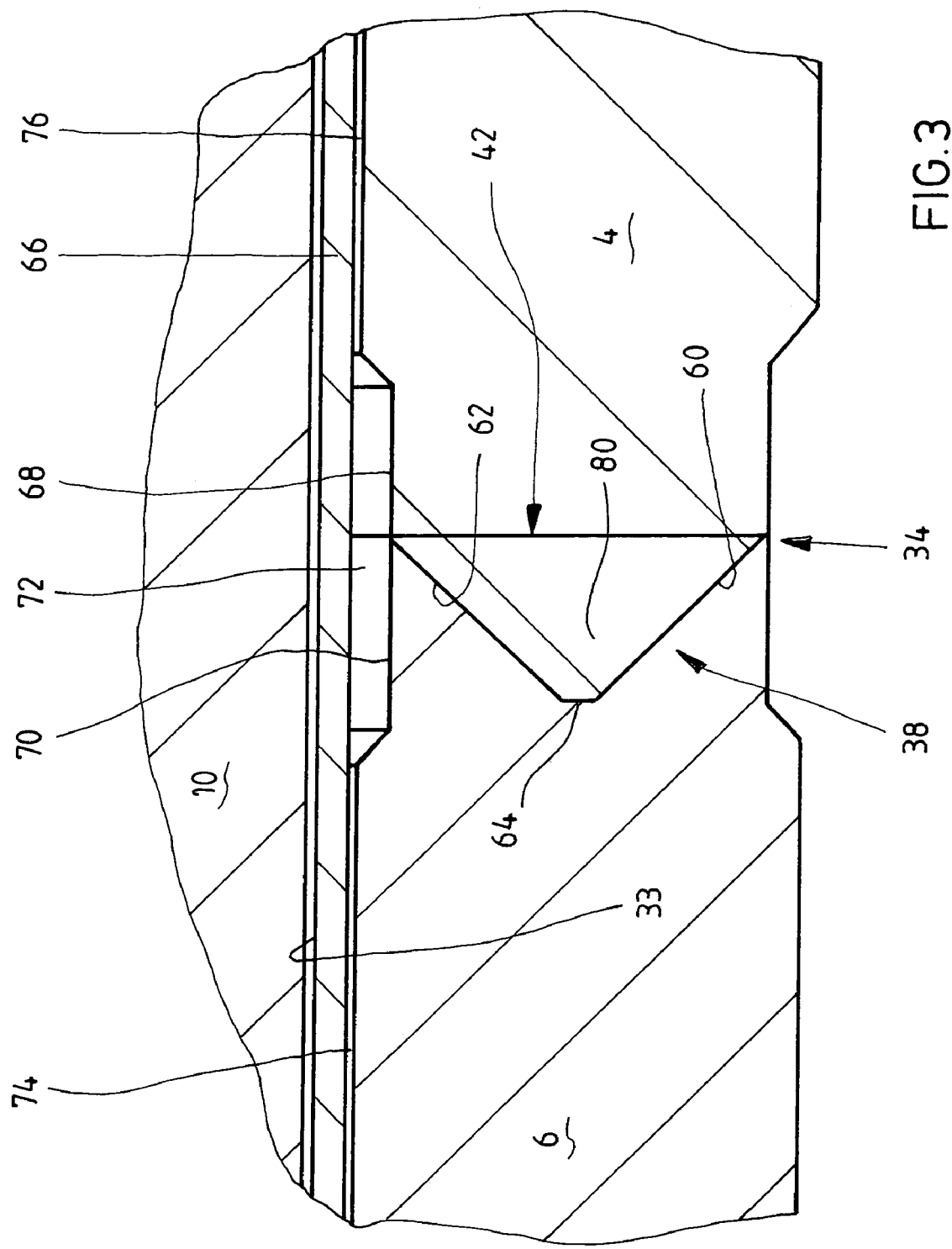
FIG. 3 is a detail view of a further embodiment of a joining region.

FIG. 3 shows a variant in which the intermediate piece 4 is formed of a material with comparatively low resistivity while the material of the pipe piece 6 has greater resistivity. In accordance with the teaching according to the invention, the cross-section of the annular end face 38 must consequently be reduced. This is achieved by forming the annular end face 38 with a trapezium-shaped projection 80, in a manner corresponding to the tube piece end face 40 of the above-described embodiment, the trapezium-shaped projection being delimited by two side faces 60, 62 and a flattened portion 64. The cross-sectional area of this flattened portion 64 is sized in accordance with the teaching according to the invention in such a way that the resulting resistance of the intermediate piece 4 is approximately the same as that of the tube piece 6, the annular end face 38 of which is configured as a planar radial surface. Prior to welding, the flattened portion 64 rests on the annular end face 38 in such a way that the heat input to the intermediate piece 4 and the tube piece 6 is substantially the same during the welding process due to the reduced cross-sectional area of the joining partner (intermediate piece 4 with lower resistivity). The pole-side joining region is formed correspondingly.

The embodiment of FIG. 3 shows a further variant of the cover described above, a sleeve 66, which covers the joining regions 34, 36, being accommodated in the accommodating area of the pole tube in this embodiment. In the embodiment shown in FIG. 3, circumferential inner recesses 68, 70, which form the accommodating area 72 together with the sleeve 66, are formed both on the intermediate piece 4 and the tube piece 6 (and on the pole piece 2). Said accommodating area is connected to the armature chamber via a gap 74 between the tube piece 6 and the sleeve 66. The accommodating area 72 on the tube piece side is connected to the accommodating area on the pole piece side via an annular gap 76. The inner circumferential surface of the sleeve 66 forms a part of the running surface 33 for the armature 10. Reference is made to the corresponding patent application for further details on a cover of this type.

Figure 4:
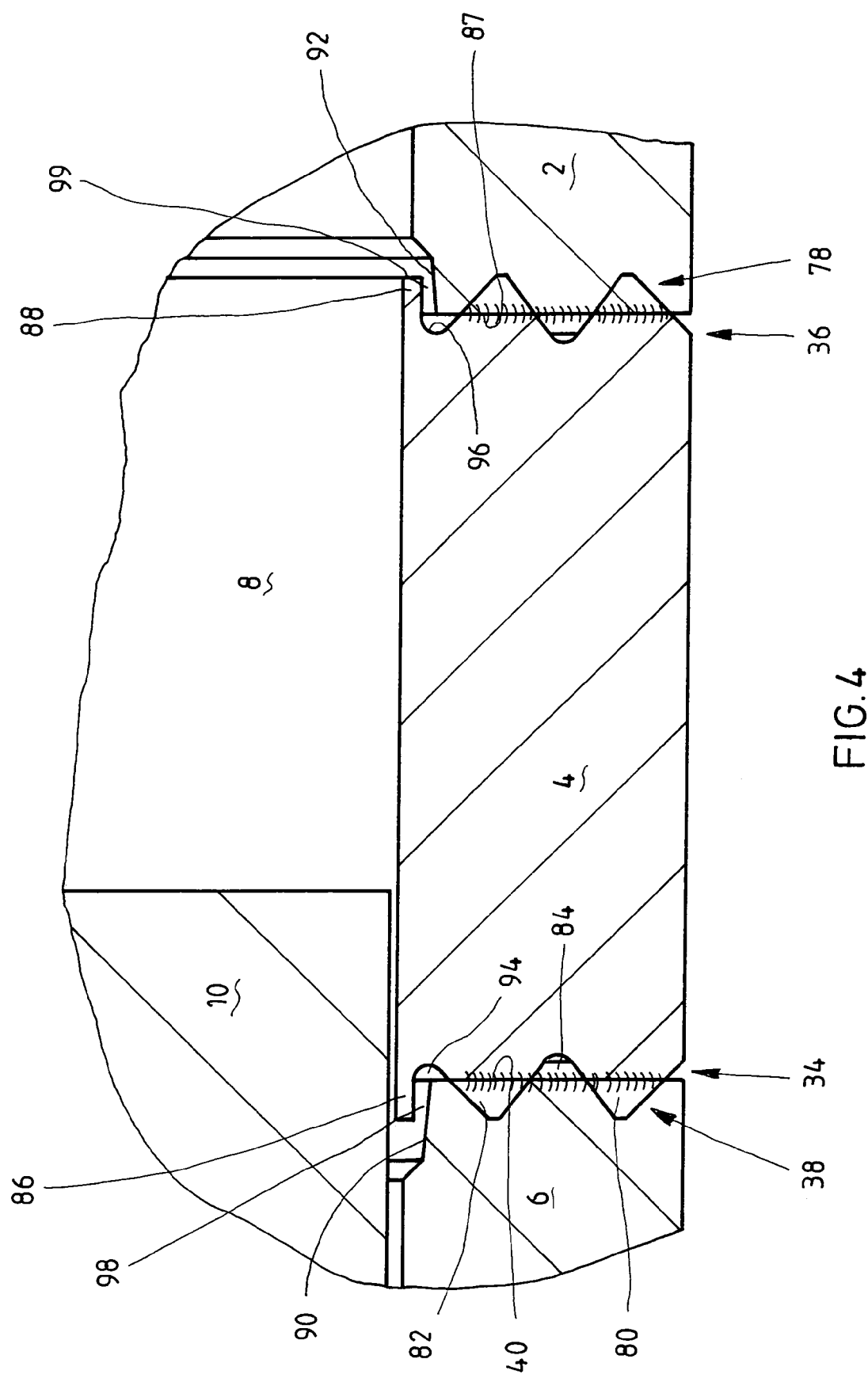
FIG. 4 is a third embodiment of a joining region of a pole tube according to the invention.

Finally, FIG. 4 shows an embodiment in which, as in the previous embodiment, the intermediate piece 4 is formed with lower resistivity than the pole piece 2 and the tube piece 6 so the effective cross-sectional area of the intermediate piece 4 must be reduced accordingly in order to ensure both joining partners receive an equal energy input. In the embodiment shown in FIG. 4, this reduction in the cross-sectional area is achieved by constructing the tube-piece-side annular end face 38 and the pole-piece-side annular end face 78 of the intermediate piece 4 with two trapezium-shaped projections 80, 82 which are each delimited by two side faces and a flattened portion. Lying between the two circumferential projections 82, 80 is a trough 84 which extends beyond the joining regions 34, 36 into the intermediate piece 4 in the welded state (see FIG. 4) and is not fused during the welding process. The tube piece end face 40 and the pole piece end face 87 are again configured as annular radial planes on which the flattened portions of the two annular projections 80, 82 rest during the welding process. The cross-sectional area is again sized in such a way that an equal heat input to the joining partners is ensured.

In this embodiment, a cover for the joining regions 34, 36 up to the armature chamber 8 is also provided, axial projections 86, 88 being provided in a manner similar to that of the embodiment in FIG. 2, but not being formed on the tube piece 6 and the pole piece 2 but rather on the two annular end faces 38 and 78 of the intermediate piece 4. These axial projections 86, 88 project into inner recesses 90, 92 of the tube piece 6 or the pole piece 2. Depressions 94, 96 are again formed in the transition region between the projections 80, 82 and the axial projections 86, 88 in such a way that an accommodating area 98, 99 for accommodating molten material is formed between the axial projection 86, 88 and the bottom of the corresponding inner annular recess 90, 92.

The invention discloses a pole tube and a solenoid actuator provided therewith, having an intermediate piece to which a pole piece and a tube piece are attached, which together delimit an accommodating area for an armature of the solenoid actuator. According to the invention, the geometry of the end face regions, which are connected by means of welding, of the intermediate piece and the tube piece and the pole piece is selected such that, taking into consideration the melting points of the materials used, the electrical resistance of the joining partners in the joining region is substantially the same, with the result that, in the case of resistance welding, the heat input to both joining partners is approximately the same.

The invention claimed is:

1. A pole tube of a solenoid actuator comprising:
   three joining partners including:
      a non-magnetic intermediate piece including a first intermediate end face and a second intermediate end face;
      a pole piece including a pole end face configured to join the first intermediate end face at a first joining region; and
      a tube piece including a tube end face configured to join the second intermediate end face at a second joining region,
   wherein a first and a second of the three joining partners are configured to be connectable to each other using electric fusion at a corresponding fusion joining region corresponding to one of the first and second joining regions,
   wherein the first joining partner includes a first material and the second joining partner includes a second material having a different conductivity than the first material, a resistivity of the first material being higher than a resistivity of the second material,
   wherein a respective end face at the fusion joining region of the second joining partner has a smaller cross-sectional area than a respective end face at the fusion joining region of the first joining partner, and
   wherein a respective part of the first joining partner disposed in the fusion joining region is configured to have an electrical resistance substantially equal to an electrical resistance of a corresponding part of the second joining partner disposed in the fusion joining region.

2. The pole tube as recited in claim 1, wherein the pole tube is configured to be used in a hydraulic valve.

3. The pole tube as recited in claim 1, wherein the respective end face of the first joining partner at the fusion joining region is substantially planar.

4. The pole tube as recited in claim 1, wherein the respective end face of the second joining partner at the fusion joining region includes at least one trapezium-shaped projecting annular projection.

5. The pole tube as recited in claim 4, wherein the annular projection includes an apex having a flattened portion configured to form the cross-sectional area of the respective end face of the second joining partner.

6. The pole tube as recited in claim 1, wherein the electrical fusion is a resistance welding.

7. The pole tube as recited in claim 6, wherein the resistance welding is a capacitor discharge welding.

8. A solenoid actuator comprising:
a pole tube having three joining partners including:
   a non-magnetic intermediate piece including a first intermediate end face and a second intermediate end face;
   a pole piece including a pole end face configured to join the first intermediate end face at a first joining region; and
   a tube piece including a tube end face configured to join the second intermediate end face at a second joining region,
wherein a first and a second of the three joining partners are configured to be connectable to each other using electric fusion at a corresponding fusion joining region corresponding to one of the first and second joining regions,
wherein the first joining partner includes a first material and the second joining partner includes a second material having have a different conductivity than, the first material, a resistivity of the first material being higher than a resistivity of the second material,
wherein a respective end face at the fusion joining region of the second joining partner has a smaller cross-sectional area than a respective end face at the fusion joining region of the first joining partner, and
wherein a respective part of the first joining partner disposed in the fusion joining region is configured to have an electrical resistance substantially equal to an electrical resistance of a corresponding part of the second joining partner disposed in the fusion joining region.

* * * * *